United States Patent [19]

Schuetz et al.

[11] Patent Number: 4,460,029
[45] Date of Patent: Jul. 17, 1984

[54] OXAZOLINE LATEX FOR TIRE CORD ADHESION

[75] Inventors: James E. Schuetz; William H. Keskey, both of Midland, Mich.

[73] Assignee: The Dow Chemical Company, Midland, Mich.

[21] Appl. No.: 445,804

[22] Filed: Dec. 1, 1982

[51] Int. Cl.³ ............................................. C08F 26/00
[52] U.S. Cl. ..................................... 152/359; 428/295; 428/375; 428/378; 428/395; 428/492; 524/458; 524/808; 427/389.9; 156/910
[58] Field of Search ................. 524/808, 458; 152/359

[56] References Cited

U.S. PATENT DOCUMENTS 3,687,888  8/1972  Frump et al. ................. 524/808
4,325,856  4/1982  Ishikawa et al. .............. 524/458

FOREIGN PATENT DOCUMENTS 2091744A  8/1982  United Kingdom ............ 524/458

Primary Examiner—Paul R. Michl
Assistant Examiner—Alex H. Walker

[57] ABSTRACT

A latex is prepared by polymerizing (a) an addition polymerizable oxazoline (such as 2-isopropenyl-2-oxazoline) and (b) at least one other monomer (such as a mixture of styrene and butadiene). The latexes of this invention are useful for promoting adhesion between a polymeric elastomer and a substrate, especially for promoting adhesion between tire cords and tire rubber.

7 Claims, No Drawings

OXAZOLINE LATEX FOR TIRE CORD ADHESION

BACKGROUND OF THE INVENTION

This invention relates to latexes polymerized from an oxazoline monomer, and to uses of such latexes as adhesion promoters for substrates in polymeric elastomers, especially for adhesion of tire cord to tire rubber.

Polymeric elastomers such as natural and synthetic rubber are extremely useful due to their elongation, resiliency, lack of permeability, high coefficient of friction, etc. However, when used by themselves, these materials are generally lacking in critical mechanical properties such as tensile strength. Therefore, it has been a standard practice in the industry to use reinforcing materials such as fibers in the manufacture of articles from polymeric elastomers. One problem with this approach, however, is that it is generally difficult to obtain good adhesion between the reinforcing material and the elastomer.

When Robert William Thompson patented the first pneumatic tire in England in 1845, the use of textile fabric as the strength member of a tire was established. The term tire "cord" became common when in 1893 John Fullerton Palmer patented the use of thread or tire cord in England and in the United States. It was not until after World War I, however, when automobiles really became popular in the United States, that square woven cotton tire fabric was commercially discarded in favor of several plies of rubber coated, warp cotton cords.

In the Thirties the first man-made fiber, rayon, a regenerated cellulose, was introduced into tires. Since rayon was spun in a continuous filament form, it had greater uniformity as cord than ordinary cotton cord. However, it lacked one of the important features of cotton, and that was good adhesion to the tire rubber. Adhesive dips such as casing and animal blood dispersions which produced satisfactory results for cotton cord were not effective for rayon. But the adhesion problem was partially solved when a World War II development effort resulted in the discovery of resorcinol-formaldehyde latex (RFL) adhesive systems. While not totally satisfactory, the RFL systems were the best available, and in fact represent the dominant commercial system in use today.

But whether rayon, nylon, polyester, glass or other fibers are used, the industry still desires better adhesion between the tire cord and the tire rubber.

SUMMARY OF THE INVENTION

In one aspect the invention is a latex which comprises discrete polymer particles which have been polymerized from (a) an addition polymerizable oxazoline in an amount such that the latex will produce greater adhesion between a substrate and a polymeric elastomer than a similar latex not having the oxazoline, and (b) at least one other monomer. In another aspect, the invention is an article comprising (a) an adhesion promoting amount of the aforementioned latex, (b) a polymeric elastomer, and (c) a substrate, wherein the substrate and elastomer are tenaciously bonded to one another, the strength of said bond being greater than if the latex were not present.

The latexes of the invention are useful for bonding a wide variety of substrates to a wide variety of polymeric elastomers, including the bonding of tire rubber to tire cords.

DETAILED DESCRIPTION OF THE INVENTION

The practice of the invention contemplates the emulsion polymerization of a synthetic latex. By the term "latex" is meant colloidally stable dispersions of discrete water-insoluble particles in an aqueous medium, which are produced by emulsion polymerization. Latexes useful in the invention are generally water-insoluble. They generally have a number average particle diameter of desirably about 20 to about 2,000 nm (nanometers; $10^{-9}$ meters), more desirably about 50 to about 1,000 nm, and preferably about 100 to about 220 nm. The latexes are typically prepared in an alkaline aqueous medium with the aid of a surfactant. Alkaline conditions are preferably employed to prevent acid hydrolysis of the oxazoline ring. Selection of an alkaline surfactant may provide sufficient pH control. In any event, a common base such as $NaHCO_3$, $NH_4OH$, $NaOH$, etc. may be used to adjust the pH.

As a first component, the latexes of the invention employ an addition polymerizable oxazoline monomer. Desirably, the oxazoline monomer is represented by the formula

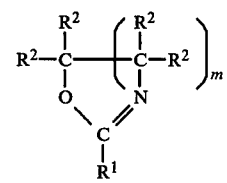

wherein $R^1$ is an acyclic organic radical having addition polymerizable unsaturation, each $R^2$ separately denotes a hydrogen atom, a halogen or an organic radical, and m is 1 or 2. In a preferred embodiment, at least two of $R^2$ are hydrogen atoms and m is 1. In a more preferred embodiment, all of $R^2$ are hydrogen atoms and m is 1. In a preferred embodiment, $R^1$ is an isopropenyl radical. In the most preferred embodiment, $R^1$ is an isopropenyl radical, all of $R^2$ are hydrogen atoms and m is 1 (2-isopropenyl-2-oxazoline).

In addition to the polymerizable oxazoline monomer, at least one other addition polymerizable monomer will be used. As the "other monomer", virtually all addition polymerizable compounds which, when copolymerized with the oxazoline monomer will result in a latex, may be used. Preferred species include monovinyl aromatic monomers, acyclic aliphatic conjugated dienes, esters of unsaturated acids with saturated alcohols, and esters of saturated acids with unsaturated alcohols.

The term "monovinyl aromatic monomer" is intended to include those monomers wherein a radical of the formula:

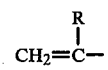

(wherein R is hydrogen or a lower alkyl such as an alkyl having from 1 to 4 carbon atoms) is attached directly to an aromatic nuclear containing from 6 to 10 carbon atoms, including those wherein the aromatic nucleus is substituted with alkyl or halogen substituents. Typical of these monomers are styrene, α-methylstyrene, ortho- , meta- and para-methylstyrene; ortho-, meta- and para-ethylstyrene; o,p-dimethylstyrene; o,p-diethylstyrene; isopropylstyrene; o-methyl-p-isopropylstyrene; p-chlorostyrene; p-bromostyrene; o,p-dichlorostyrene; o,p-dibromostyrene; vinylnaphthalene; diverse vinyl (alkylnaphthalenes) and vinyl (halonaphthalenes) and comonomeric mixtures thereof. Because of considerations such as cost, availability, ease of use, etc., styrene and vinyltoluene are preferred and styrene is especially preferred as the monovinyl aromatic monomer.

The term "acyclic aliphatic conjugated diene" is meant to include, typically, those compounds containing from 4 to about 9 carbon atoms such as, for example, 1,3-butadiene, 2-methyl-1,3-butadiene; 2,3-dimethyl-1,3-butadiene; pentadiene; 2-neopentyl-1,3-butadiene and other hydrocarbon analogs of 2,3-butadienes, such as 2-chloro-1,3-butadiene; 2-cyano-1,3-butadiene, the substituted straight chain conjugated pentadienes, the straight chain and branched chain conjugated hexadienes, other straight and branched chain conjugated dienes having from 4 to about 9 carbon atoms, and comonomeric mixtures thereof. The 1,3-butadiene hydrocarbon monomers such as those mentioned hereinbefore provide interpolymers having particularly desirable properties and are therefore preferred. The cost, ready availability and the excellent properties of interpolymers produced therefrom makes 1,3-butadiene the most preferred acyclic aliphatic conjugated diene.

The term "esters of unsaturated acids with saturated alcohols" is meant to include, typically, soft acrylates (i.e., those whose homopolymers have a glass transition temperature ($T_g$) of less than about 25° C.) such as benzyl acrylate, butyl acrylate, sec-butyl acrylate, cyclohexyl acrylate, dodecyl acrylate, ethyl acrylate, 2-ethylbutyl acrylate, 2-ethylhexyl acrylate, heptyl acrylate, hexyl acrylate, isobutyl acrylate, isopropyl acrylate, methyl acrylate, propyl acrylate, etc.; hard acrylates (i.e., those whose homopolymers have a $T_g$ of greater than about 25° C.) such as 4-biphenylyl acrylate and tert-butyl acrylate; soft methacrylates such as butyl methacrylate, and hexyl methacrylate; and hard methacrylates such as sec-butyl methacrylate, tert-butyl methacrylate, cyclohexyl methacrylate, ethyl methacrylate, isobutyl methacrylate, isopropyl methacrylate, methyl methacrylate, propyl methacrylate, etc. The cost, availability and known properties of butyl acrylate and ethyl acrylate make these monomers preferred among the acrylates. The cost, availability and known properties of methyl methacrylate make it preferred among the methacrylates.

The term "esters of saturated acids with unsaturated alcohols" is meant to include, typically, vinyl acetate, vinyl propionate, vinyl butyrate, vinyl 2-ethylhexoate, vinyl benzoate, and the like. The low cost and ready availability of vinyl acetate makes it desirable for use in the invention.

As the other monomer, it is often desirable to employ a mixture of two or more monomers. For instance, latexes having both a hard ester and a soft ester, and those having both an acyclic aliphatic conjugated diene and a monovinyl aromatic monomer are especially well known, convenient to make, and have predictable and useful properties.

Especially in instances where preferred classes of monomers are used, it may be desirable to include other monomers in minor amounts, so long as the final properties of the latex are not significantly impaired. For instance, when 2-isopropenyl-2-oxazoline, styrene, and 1,3-butadiene are used, it may be desirable to include minor amounts (e.g., 2 weight percent) of a water-soluble monomer such as acrylamide.

The proportions of monomers used in the latex may vary considerably, depending on the particular end use of the binding composition. If more than one "other" monomer is used, they will be present in relative proportion according to the desired properties of the finished latex. The oxazoline monomer is present in an amount to increase adhesion of a substrate to a polymeric elastomer compared to a similar latex prepared without the oxazoline. Typically, the latex monomer charge will have desirably about 0.1 to about 50, preferably about 0.2 to about 20 weight percent oxazoline monomer, the remainder being other monomer.

The latexes are conveniently prepared by conventional emulsion polymerization techniques in an aqueous medium with conventional additives. Thus, for example, the monomer charge desired to be employed for the latex is dispersed in an alkaline aqueous medium with agitation and with the aid of from about 0.5 to about 5 weight percent (based upon the monomer charge) of conventional anionic and/or nonionic emulsifiers (e.g., potassium n-dodecyl sulfonate, sodium isooctylbenzene sulfonate, sodium laurate, nonylphenol ethers of polyethylene glycols, modified rosin soaps, and the like) and thereafter polymerizing the resulting aqueous dispersion.

Conventional emulsion polymerization catalysts can be employed in the foregoing latex polymerization and common examples thereof include peroxides, persulfates, azo compounds and the like such as sodium persulfate, potassium persulfate, ammonium persulfate, hydrogen peroxide, azodiisobutyric diamide as well as catalysts (e.g., redox catalyst) which are activated in the water phase (e.g., by a water-soluble reducing agent). Typically, such catalyst are employed in a catalytic amount, e.g., ranging from 0.01 to about 5 weight percent based upon the monomer weight. In general, the polymerization is conducted at a temperature in the range of from about −20° to about 110° C. (preferably from about 0° to about 90° C.) and at a pH of from about 7 to about 12, preferably from about 7 to about 11 and especially from about 7.5 to about 9.5.

Similarly, conventional chain transfer agents such as, for example, n-dodecyl mercaptan, bromoform, carbon tetrachloride and the like can also be employed in the normal fashion in the aforementioned first stage polymerization to regulate the molecular weight of the polymer formed therein, and, typically, when such chain transfer agents are used, they are employed in amounts ranging from 0.01 to about 10 (preferably from about 0.1 to about 5) weight percent based upon the weight of the monomers employed in the polymerization.

After polymerization, the latexes are preferably processed to remove any unreacted monomer.

Suitable latex polymerization procedures are taught, for instance, in U.S. Pat. Nos. 4,325,856; 4,001,163; 3,513,121; 3,575,913; 3,634,298; 2,399,684; 2,790,735; 2,880,189; and 2,949,386.

The practice of the invention contemplates the use of the latex to promote adhesion between a polymeric elastomer and substrate. By "elastomer" is meant any polymeric material which has the ability to stretch at least about two times its length, and to rapidly return to its original dimensions when the stretching force is removed. Preferred polymeric elastomers include natural rubber and synthetic rubber such as those made from various combinations of styrene, 1,3-butadiene, and 2-methyl-1,3-butadiene (also known as isoprene).

As the substrate, virtually any nonelastomeric material may be used. Materials such as metals, concrete, rock, wood, glass and thermoset and thermoplastic polymers are suitable for use as the substrate. More preferred as a substrate are fibrous materials, especially those in the form of threads or cords. Suitable fibers include polymeric fibers such as nylon, rayon, polyester, and aramid; and mineral fibers such as fiberglass.

The latex, elastomer, and substrate may be combined together in any manner in which the latex will promote adhesion of the elastomer to the substrate. One suitable method is to blend the latex with the elastomer prior to joining the elastomer to the substrate. A more preferred method, however, is to precoat the substrate with the latex, allowing it to dry on the substrate, heat treating the latex, and then joining the substrate to the elastomer. Once the elastomer and substrate are contacted, any normal curing processes may be used. For instance, it is conventional when using synthetic rubbers to vulcanize the rubber by applying pressure and heat. This induces crosslinking of the polymer chains via sulfur bridges. Other suitable curing mechanisms are also usable in this invention.

In a particularly preferred embodiment, the latexes of the invention are used to promote the adhesion of tire cords to tire rubber. In this preferred embodiment, the tire cord, in the form of a continuous strand, may be conveniently run through a latex bath, dried, cured at elevated temperature, and returned to a spool, or taken directly to a tire building machine. A conventional tire rubber mixture containing sulfur for vulcanization is then used as the tire carcass. After the tire has been molded, it is subjected, in a conventional manner to heat and pressure to cure the rubber. Tires produced in this manner have extremely good rubber to cord adhesion.

The invention is further illustrated and explained in the following examples. In the examples, all parts and percentages are by weight unless otherwise specified.

EXAMPLE 1

A series of latex are prepared using conventional emulsion polymerization techniques and, per 100 parts of monomer, 147.75 parts of water, 0.01 part VERSENEX® 80 chelating agent (pentasodium salt of (carboxy methylimino)bis (ethylenenitrilo)tetraacetic acid, available from The Dow Chemical Company, Midland, MI, USA), 5.0 parts of Dresinate 214 (potassium soap of a modified rosin, available from Hercules, Inc., Wilmington, DE, USA), 0.50 part of sodium persulfate, and 0.5 part of t-dodecylmercaptan. As the monomers, various proportions of styrene, 1,3-butadiene, and 2-isopropenyl-2-oxazoline are used. The reaction mixture is polymerized at 60° C. for 8 hours, cooled, and chain terminated with 0.5 part of sodium dimethyldithiocarbamate. Unreacted monomer is then removed until the residual 2-isopropenyl-2-oxazoline present is less than 10 ppm. Then, 500 ppm formaldehyde are added as a biocide, and 1 percent of a conventional antioxidant package is added.

A 3-ply polyester tire cord is dipped into the latex, suspended between two fixed points (to prevent shrinkage), and cured in an oven for 145 seconds at 85° C. and then for 90 seconds at 190° C.

Into the right side of a shallow, rectangular mold cavity is placed a pad of fully cured black rubber. Into the left side of the cavity is placed an uncured rubber pad with a nylon backing, and on top of that is placed an uncured rubber pad without a nylon backing. The cured rubber pad has a thickness which is roughly equal to the combined thickness of the two uncured rubber pads. Then, sections of treated tire cord are laid across the rubber pads, perpendicular to the interface between the cured and uncured rubber. Then, a second cured rubber pad is placed over the first cured rubber pad. Similarly, on the left side of the mold, a second uncured rubber pad without nylon backing is placed on the first such pad, and this is followed by a second uncured rubber pad with nylon backing.

The rubber pads, which have the tire cords sandwiched between, are then molded at 160° C., 800 psi (5.5 megapascals) for 10 minutes. The rubber is then removed from the mold and allowed to cool. Since the rubber on the right side of the mold was cured before the molding operation, it does not stick to the tire cords and is easily removed. The result is a cured rubber composite (the rubber from the left side of the mold) having tire cords extending perpendicularly from an edge toward what was the right side of the mold.

A cut is then made into the rubber specimen along a line perpendicular to the tire cords, and ¼ in. (6.35 mm) from the edge from which the tire cords protrude. This cut is sufficiently deep to severe the tire cords but sufficiently shallow that the lower piece of the nylon backing remains intact. The section of cured rubber distal to the protruding tire cords is then placed in one jaw of an Instron tester. The free end of a single tire cord is then placed in the other jaw of the tester. The testor is then run at a jaw speed of 5 in./min. (127 mm/min.) to determine the force required to pull the cord out of the rubber. Since the cut into the rubber leaves only ¼ in. of tire cord in the rubber, a direct reading from the Instron machine must be multiplied by 4 to express the result in lbs/in. The testing procedure is then repeated for the remaining cords in the sample, and the entire procedure repeated for the remaining latexes. The results are shown in Table I.

COMPARATIVE EXAMPLE 1

Following the procedure of Example 1, a latex is made without the 2-isopropenyl-2-oxazoline, and a latex is made having 2-vinyl pyridene present as a monomer. These results are shown in Table I.

EXAMPLE 2 AND COMPARATIVE EXAMPLE 2

The procedures of Example 1 and Comparative Example 1 are repeated, except that the tire cords are dipped not into the poured latex, but rather are dipped into a mixture of the following ingredients.

|  | Dry Basis | Wet Basis |
|---|---|---|
| Resin Solution | | |
| Penecolite Resin R-2200 (70%)[1] | 12.6 | 18.0 |
| Sodium Hydroxide (50%) | 0.3 | 0.6 |
| Formaldehyde (37%) | 4.5 | 12.2 |
| Water (deionized) | — | 175.0 |
| Final RFL Mix | | |
| Latex (40%) | 100.0 | 250.0 |
| Ammonium Hydroxide (28%) | — | 12.0 |
| Water (deionized) | — | 65.8 |
| Totals | 117.4 | 533.6 |

Total Percent Solids = 22.0
[1] Penacolite is a registered trademark of the Koppers Company, Inc.

This mixture is prepared by adding the 50 percent sodium hydroxide to the water, adding the Penacolite resin, agitating for 10 minutes, and adding the formaldehyde, followed by another 5 minutes of agitation. Then, the latex, ammonium hydroxide, and water are added, in order, to the above mixture. The mixture is then allowed to age at room temperature for at least 12 hours before use.

EXAMPLE 3 AND COMPARATIVE EXAMPLE 3

The procedures of Example 2 and Comparative Example 2 are repeated except that tire cords made of nylon 6,6 is used instead of polyester. The results are shown in Table III.

TABLE I

POLYESTER/NEAT LATEX

| Sample | Butadiene | Styrene | IPO[1] | 2-vinyl Pyridine | % Pickup | Adhesion (lbs/inch) |
|---|---|---|---|---|---|---|
| 1-1* | 70 | 30 | — | — | 12.2 | 8.7 |
| 1-2 | 70 | 25 | 5 | — | 7.9 | 30.0 |
| 1-3 | 70 | 20 | 10 | — | 16.1 | 25.1 |
| 1-4* | 70 | 15 | — | 15 | 12.8 | 23.9 |

*Not an example of the invention.
[1]IPO is 2-isopropenyl-2-oxazoline

TABLE II

POLYESTER/RFL MIX

| Sample | Butadiene | Styrene | IPO[1] | 2-Vinyl Pyridine | % Pickup | Adhesion (lbs/inch) |
|---|---|---|---|---|---|---|
| 2-1* | 70 | 30 | — | — | 6.4 | 24.0 |
| 2-2 | 70 | 25 | 5 | — | 7.2 | 48.5 |
| 2-3 | 70 | 20 | 10 | — | 7.6 | 32.5 |
| 2-4* | 70 | 15 | — | 15 | 7.4 | 26.1 |

*Not an example of the invention.
[1]IPO is 2-isopropenyl-2-oxazoline

TABLE III

NYLON 6,6/RFL MIX

| Sample | Butadiene | Styrene | IPO[1] | 2-Vinyl Pyridine | % Pickup | Adhesion (lbs/inch) |
|---|---|---|---|---|---|---|
| 3-1* | 70 | 30 | — | — | 7.4 | 68.0 |
| 3-2 | 70 | 25 | 5 | — | 8.2 | 83.5 |
| 3-3 | 70 | 20 | 10 | — | 7.9 | 93.2 |
| 3-4* | 70 | 15 | — | 15 | 7.3 | 85.0 |

*Not an example of the invention.
[1]IPO is 2-isopropenyl-2-oxazoline

What is claimed is:

1. A composite which is a pneumatic tire comprising
   (a) a polymeric elastomer,
   (b) a substrate and
   (c) an adhesion promoting amount of a latex, said latex comprising discrete polymer particles which have been polymerized from
      (i) an addition polymerizable oxazoline in an amount such that the latex will produce greater adhesion between a substrate and a polymeric elastomer than a similar latex not having the oxazoline and
      (ii) at least one other monomer
   wherein the elastomer is adhesively bound to the substrate, and such adhesion is more tenacious than if the latex were not present.

2. The composite of claim 1 wherein the latex has been coated onto the substrate, and dried.

3. The composite of claim 2 wherein the latex coated substrate is dried at a temperature of about 105° C. or higher.

4. The composite of claim 1 wherein the elastomer is natural rubber or a synthetic rubber made from styrene and 1,3-butadiene.

5. The composite of claim 1 wherein the substrate is a fiber.

6. The composite of claim 5 wherein the fiber is polyester, nylon 6,6, rayon, or fiberglass.

7. The composite of claim 4 wherein the addition polymerizable oxazoline is 2-isopropenyl-2-oxazoline.

* * * * *